United States Patent [19]

Orlowski

[11] 4,304,409
[45] Dec. 8, 1981

[54] SEALING ASSEMBLY

[75] Inventor: David C. Orlowski, Milan, Ill.

[73] Assignee: Inpro, Inc., Rock Island, Ill.

[21] Appl. No.: 48,012

[22] Filed: Jun. 11, 1979

[51] Int. Cl.³ ............................................. F16J 15/44
[52] U.S. Cl. ..................................... 277/53; 277/205
[58] Field of Search ................................ 277/53, 205

[56] References Cited

U.S. PATENT DOCUMENTS

| 1,168,002 | 1/1916 | Hirth | 277/53 |
| 4,022,479 | 5/1977 | Orlowski | 277/53 |
| 4,067,407 | 1/1978 | Berg | 277/205 |
| 4,114,902 | 9/1978 | Orlowski | 277/53 |

Primary Examiner—Robert I. Smith
Attorney, Agent, or Firm—Y. Judd Azulay

[57] ABSTRACT

An improved sealing assembly arranged to be used with a bearing shaft and housing. The sealing assembly is positioned in between the shaft and housing and includes a multi-ring structure journaled to the housing and arranged in between the shaft and housing. The improvement comprises a pressure and self-compensating radial-contact sealing device mounted within an enclosure of the multi-ring sealing structure and positioned radially to the bearing shaft. The radial-contact sealing device consists of a cover and a support spring partially capsulated by the cover.

11 Claims, 5 Drawing Figures

SEALING ASSEMBLY

BACKGROUND OF THE INVENTION

This invention relates to sealing devices and more particularly to multi-component sealing assemblies useful with a bearing shaft and housing system where a liquid differential pressure is present.

In most industries, it is extremely important that there be provided a seal which prevents the fluids associated with pumping, mixing or lubrication of bearings from leaking externally of an associated housing or bearing support and for preventing foreign particles in the pumped fluid or environment from working themselves through the seal and/or into the bearings.

In fact, the need of an effective sealing means may be more critical than in the more common ball bearing shaft and housing systems as disclosed in U.S. Pat. No. 4,114,902.

In the above-cited patent, there is a two-ring sealing structure disclosed where the mating flange of one ring has at least one groove with respect to the recess (in which the flange fits) on the other ring. A groove is also provided on the inwardly facing wall of the recess. The grooves act to inhibit foreign particle migration axially along the shaft.

The present invention provides a more effective seal in that the sealing structure of the prior art is not effective in all cases such as when the sealing structure is submerged under the liquid lubricant level or where a differential fluid pressure exists, as is the case with rotating pumping or mixing equipment. In such an arrangement, where the sealing assembly is below the level of the lubricant, there is a pressure differential, i.e., from a higher to a lower pressure, and the prior art seals are not adapted to seal off lubricants, fluids or contaminants in such a system as is the present improved seal.

The present seal, which is a "radial" seal, is not subject to a multitude of variables which tend to destroy the conventional "axial end-face" mechanical seals. The present seal being essentially a pressure differential seal and is adapted to seal the leakage of lubricating fluid from the bearings and the passage of pumped fluids into or from the sealed or inner areas. In such instances the use of the present sealing assembly has been found to be quite effective.

SUMMARY OF THE INVENTION

This invention provides an improved sealing assembly which is a liquid pressure differential seal useful with a bearing shaft and housing. The sealing assembly includes a multi-ring sealing structure journaled to the housing and arranged in between the shaft and housing. The multi-ring structure is arranged so that a first (stator) ring is pressed into the housing and a second (rotor) ring is press-fitted to the shaft. The improvement comprises a pressure and self-compensating sealing device positioned radially to the shaft and mounted within the multi-ring sealing structure, the sealing device consisting of a cover and a support spring partially capsulated by the cover.

The cover of the sealing device is U-shaped having legs or lips adapted to be pressed against members of the multi-ring structure to press the members into sealing contact radially to the sealing surface of the shaft, whereby the leakage of the fluid from the bearings and housing outwardly and the leakage of foreign fluids from the pump housing into the bearings and fluid are prevented, as is migration of pumped (pressurized) fluid from the pump fluid housing.

BRIEF DESCRIPTION OF THE DRAWINGS

The present sealing assembly and its advantages over prior art assemblies will be more apparent when considering the following description in conjunction with the drawings, in which.

DESCRIPTION OF THE PREFERRED EMBODIMENT

The present sealing assembly as disclosed herein may be used in a system where the bearing shaft is stationary and the housing rotates, where the housing is stationary and the shaft rotates, or where both the shaft and housing rotate relative to the other. The housing could be a pump fluid encasement or bearing enclosure.

Figure 1:
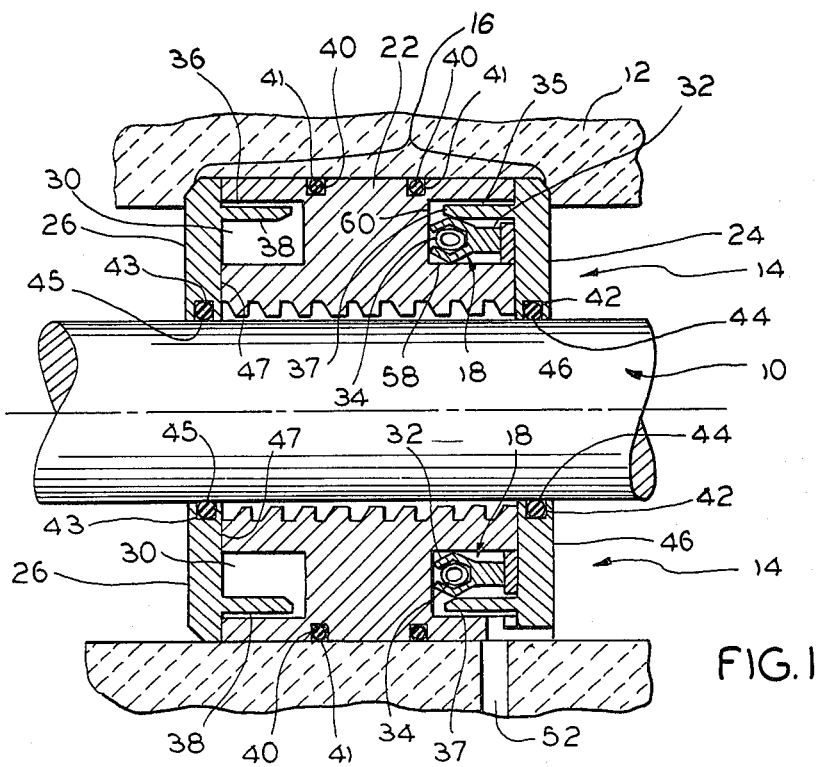
FIG. 1 is an elevational sectional view of the present sealing assembly with a bearing shaft and housing.

Referring to FIG. 1, there is shown an arrangement in which the sealing assembly of the present invention may be used. As shown, the sealing assembly is positioned in between the bearing shaft 10 and the housing 12. A conventional race with bearings may be journaled to the shaft 10 as described in U.S. Pat. No. 4,114,902, which is herein incorporated by reference. Accordingly, lubricant is provided by well-known means to the race and bearings or, in the case of rotating pumps or mixers, fluid has energy imparted to it to produce pressure and/or motion.

The sealing assembly 14, as shown, comprises a multi-ring structure 16 and a sealing device 18 mounted within an enclosure or gland 20 of the multi-ring structure which is arranged around the shaft 10.

The multi-ring structure 16 includes a first ring 22 and a second ring 24 and a third ring 26 arranged at opposite ends of the first ring. In the gland 20, which is formed by the first ring 22 with the second ring 24, is positioned an insert member 28. A second gland 30 is formed by the first ring 22 with the third ring 26.

Figure 2:
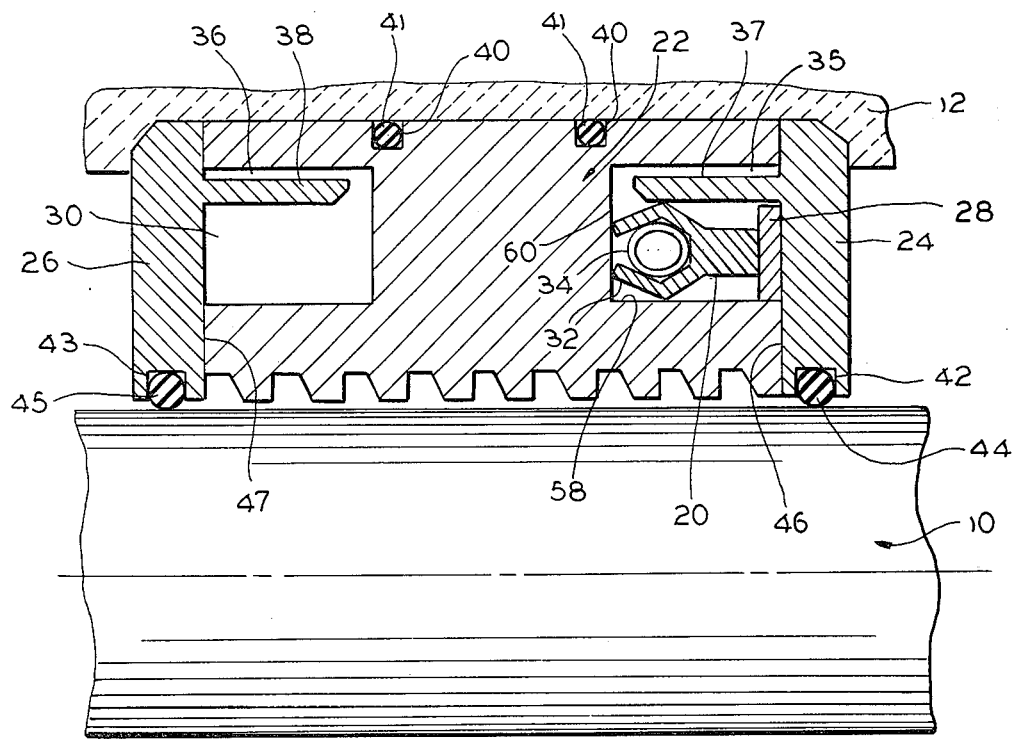
FIG. 2 is an enlarged partial sectional view of the sealing assembly of FIG. 1.

As shown in FIGS. 1 and 2, there is only one sealing device 18 mounted within the multi-ring structure. Accordingly, the sealing device may be mounted in either enclosure or gland (i.e., gland 20 or gland 30).

The sealing device 18, as shown in FIGS. 1 and 2, complements the multi-ring sealing structure in providing a highly effective seal for the rotating shaft 10 and housing 12. The sealing device 18 consists of a cover 32 comprising a U-shaped low friction ring having its U-shaped opening extending axially and a support spring 34 which is partially capsulated by the cover 32, and which spring 34 compensates for the insufficient memory of the cover 32 to maintain a specific shape of the sealing device 18.

Figure 3:
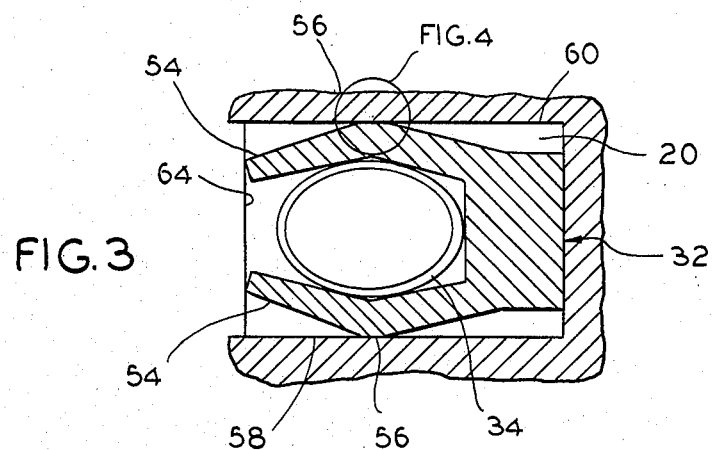
FIG. 3 is an exploded view of the sealing device mounted within an enclosure of the sealing assembly.

The sealing device 18 mounted within the enclosure, i.e., gland 20 of the multi-ring structure 16 is positioned around the shaft 10 and, when opened by internal or external pressures, presses against the surface of insert member 28, as well as the surfaces of the first ring 22 and second ring 24 (FIG. 3).

The first ring 22 of the multi-ring sealing structure 16 has at opposite ends annular axially extending recesses 35 and 36. The second ring 24 and third ring 26 positioned at opposite ends of the first ring 22 each have an annular extending flange (i.e., flange 37 of second ring 24 and flange 38 of third ring 26). Accordingly, as shown in FIGS. 1 and 2, flange 37 fits within recess 35, and flange 38 fits within recess 36 of first ring 22.

The first ring 22 possesses external annular grooves 40 in which seats a conventional O-ring 41 that bears against a complementary opening in the housing 12. The frictional engagement of O-rings 41 between the first ring 22 and the housing causes the first ring 22 to be fixed or to rotate with the housing 12.

The second ring 24 and third ring 26 have, respectively, internal annular grooves 42 and 43 that are fitted, respectively, with conventional O-rings 44 and 45 (FIGS. 1 and 2) for friction drive and static seal. The second and third rings, which fit around the shaft 10, are caused by the frictional engagement of the O-rings 44 and 45 between them and the shaft 10 to be fixed to rotate with the shaft. Accordingly, the rings are arranged where the first ring 22 may be secured to a stationary member, e.g., the housing 12, and the other rings (i.e., second ring 24 and third ring 26) are secured to the rotating member, e.g., the shaft 10. The housing 12 and shaft 10 may also be arranged where the shaft is stationary and the housing 12 rotates. Or, as indicated above, the shaft and housing may both rotate relative to the other. In structure and sealing function, the rings 22 and 24 and rings 22 and 26 are sealed along a radial line-contact. That is, the stator (first) ring 22 is sealed, respectively, to rotor (second) ring 24 along sealing interface 46 and is similarly sealed to rotor (third) ring 26 along sealing interface 47. The sealing surfaces of the rings at the interface sealing contact are predictably smooth and hard to form a stable and secure seal against the leakage outward of fluids. Contaminants, e.g., foreign, abrasive particles from the pumped fluid are centrifugally expelled at the rotorstator interface prior to presentation at the radially contacting point.

Figure 5:
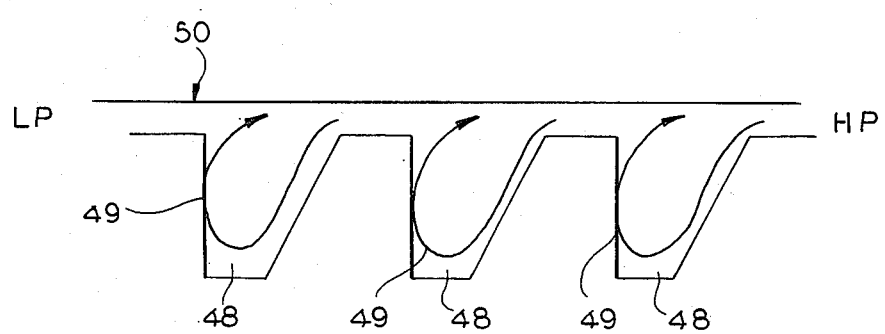
FIG. 5 is an exploded view of the grooves of a ring member of the sealing assembly in relation to the surface of the shaft, to illustrate the control of fluid flow in the event of failure or wear of the contacting portion of the sealing device.

Should the Primary Radial Seal degrade or fail, the leakage of fluid outward is inhibited by the design and arrangement of the specifically contoured labyrinth grooves 48 in the stator (first) ring 22 (see FIG. 5). As shown in FIG. 5 by the arrows 49, a hydraulic dam effect is provided by the design of the grooves 48 to inhibit leakage of fluids between the sealing assembly 14 and the sealing surface 50 of the shaft 10.

In addition, by means of the symmetrical design of the present sealing assembly 14, i.e., two rotor rings 24 and 26, the leakage, due to failure of the contacting ring (e.g., ring 24), can be controlled and directed to waste through the outermost discharge orifice 52, or reintroduced into the fluid stream through the stuffing box (not shown) by pumps outside the discharge orifice 52. The opposite end of the rotor ring-stator ring arrangement is noncontacting and nondeteriorating because there is no contact sealing device 18 mounted at the end.

The sealing device 18, as shown in FIGS. 1, 2, and 3 consists of a U-shaped, Teflon compound or similar cover 32 in which is partially encapsulated a support spring 34. The support spring 34 is preferably a helically round, flexible flat wire that is formed into a flexible tubing. The cover 32 is made of a chemically inert, low-friction material. Although Teflon has been found to be quite satisfactory, other similar chemically inert low-wear materials may be used as the cover 32.

The cover 32 has legs 54 which have lips 56 adapted to be pressed, respectively, against the surfaces 58 (of ring 22) and 60 (of ring 24) (FIG. 3). The cover 26 has a flat backing 62 which presses against the side of the gland 20 formed by rings 22 and 24 to securing the sealing device 18 in position. The insert 28 is provided, in addition, to secure the sealing device in position.

Figure 4:
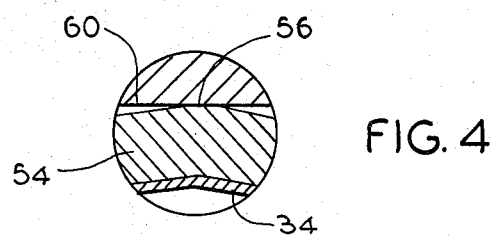
FIG. 4 is an enlarged view of the area—4 encircled in FIG. 3 illustrating the contact of the cover lip of the sealing device against the surface of a ring member of the sealing assembly.

Referring to FIGS. 3 and 4, the sealing device 18 is shown as it is positioned within the enclosure of gland 20 of the multi-ring sealing structure 16. As shown, upon installation, the spring-imposed load (of spring 34) causes the material, e.g., teflon, of the cover 32 to flow into the discontinuities of the surfaces 58 (of ring 22) and 60 (of ring 24), as well as the surface 64 of the insert member 32. The cold flow of the teflon is utilized to provide conformance with the surfaces of the members of the multi-ring structure 16 to press them together into sealing contact and against the sealing surface 50 of the shaft 10 to ensure an effective, positive differential pressure ($\Delta P$) seal. That is, as the legs 54 of the sealing device cover 32 are opened by internal or external pressures, the lips 56 are pressed against the surfaces of members 22 and 24 of the multi-ring structure 16 to press the members into sealing contact and against the surface 50 of the shaft 10, whereby the leakage of the fluid from the bearings and housing outwardly and the leakage of foreign particles from outside the housing into the bearings and fluid are prevented. Said foreign particles, because of their inherant specific gravity being greater than that of the vehicle fluid, are centrifuged outwardly prior to their impingement on, or introduction to the contacting interface.

In the sealing device 18, the support spring 34 is a resilient wire which provides a permanent resiliency for the sealing device 18, whereby the lips of cover 32 are maintained with minimum pressure against the surfaces of the members of the multi-ring structure (e.g., surface 58 of ring 22).

The Teflon compounded cover is thermally and chemically resistant to failure. Said Teflon cover is chemically inert and solvent resistant to essentially all chemicals. The teflon sealing cover 26 is resistant to temperatures ranging from about $-425°$ F. to about $500°$ F.

The pressure application in which the sealing device is used determines by what means or force the lips are pressed against surfaces to provide an effective seal. When the sealing assembly is used in a low pressure application (i.e., of the shaft and housing system), the support ring 28 lightly forces the cover lips 56 against the surfaces 58 and 60, respectively, of the stator ring 22 and the rotor ring 24.

In the case where the sealing assembly is used in a high pressure differential application, the hydraulic pressure around the shaft and housing system forces the cover lips 56 proportionally against the surfaces of the stator ring 22 and rotor ring 24.

In the radial contact of the ring members 22 and 24 of the multi-ring structure 16, the pressure of the contact is directly proportional to the differential pressure ($\Delta P$) across the seal at the interface 46. That is, the pressure tends to open faces or legs 54 of the sealing device and to increase the contact force at the interface.

The present sealing assembly can be utilized ubiquitously whenever a differential liquid pressure is intended to be sealed from high pressure to low pressure. This is the case in centrifugal or rotary (positive displacement) pump liquid end stuffing boxes, and, in the case of lubricated bearings where the lubricant level is carried above the seal level, thereby it establishes a static pressure to the seal.

Generally, the sealing assembly may be conveniently used in rotating equipment (e.g., pumps, gears, turbines, motors, mixers, and pillow-block bearings) because of simplicity of design and cartridge-type "plug in" ease of installation. The contact takes place within the assembly so that it can be replaced in kind without detrimental effect to the rotating equipment into which it is embodied. Since the contact of the present seal is "radial" instead of axial, the variables that adversely affect "axial end-face" sealing devices are eliminated or drastically minimized. Such variables include axial travel, radial eccentricity or run-out, shock loading (thermal or mechanical) misalignment to perpendicular, axial positioning upon installation and axial tensioning of mating parts.

Moreover, the contact surfaces within the assembly can be modified (hardened, smooth-surfaced, etc.) without modification of the equipment into which it is incorporated, whether it be rotating, static, or axially oscillating equipment.

I claim:

1. A liquid pressure differential sealing assembly arranged to be used with a bearing shaft and housing and positioned in between said shaft and housing, said assembly comprising:
   (a) a multi-ring sealing structure with a first ring have annular axially extending recesses at opposite ends and second and third rings positioned at said opposite ends of said first ring and each having an annular extending flange that fits, respectively, within said opposing recesses; and
   (b) a pressure and self-compensating sealing device mounted within an enclosure of said multi-ring structure and positioned around said shaft, said pressure and self-compensating sealing device consisting of an U-shaped low friction ring having its U-shaped opening extending axially and a support ring partially encapsulated in said U-shaped ring.

2. A sealing device according to claim 1, wherein said sealing device is mounted within an enclosure formed by said first ring with either said second or third ring.

3. A sealing assembly according to claim 1, wherein said sealing device U-shaped low friction ring having its U-shaped opening extending axially is adapted to be pressed against members of said multi-ring structure to press said members into sealing contact and against the sealing surface of said shaft, whereby the leakage of the fluid from the bearings and housing outwardly and the leakage of foreign particles from the housing into the bearings and contacting interface are prevented.

4. A sealing assembly according to claim 1, wherein said U-Shaped low friction ring having its U-shaped opening extending axially is a chemically inert, low-friction material.

5. A sealing assembly according to claim 4, wherein said U-shaped low friction ring having its U-shaped opening extending axially is a Teflon compound and thermally and chemically resistant to wear and failure.

6. A sealing assembly according to claim 5, wherein said U-shaped low friction ring having its U-shaped opening extending axially is resistant to failure at temperatures ranging from about $-425°$ F. to about $500°$ F.

7. A sealing assembly according to claim 1, wherein said support spring is a helically wound, flexible flat wire.

8. A sealing assembly according to claim 7, wherein said wire is resilient and provides a permanent resiliency for said sealing device.

9. A sealing assembly according to claim 1, wherein said sealing assembly is used in a low or negative pressure application, said support spring forces the U-shaped low friction ring having its U-Shaped opening extending axially against the members of said multi-ring structure to press said members into minimum pressure sealing contact and radially to said shaft to provide an effective seal.

10. A sealing assembly according to claim 1, wherein said sealing assembly is used in a high pressure application, the pressure in the shaft and housing system forces the U-shaped low friction ring having its U-shaped opening extending axially, against the members of said multi-ring structure to press said members into proportional pressure sealing contact and radially to said shaft to provide an effective seal.

11. A sealing assembly according to claim 1, said sealing assembly normally being vulnerable to abrasive particle wear at the radially contacting interface. The improvement comprising higher specific gravity abrasive particles centrifugally eliminated prior to introduction at the rotating interface.

* * * * *